UNITED STATES PATENT OFFICE.

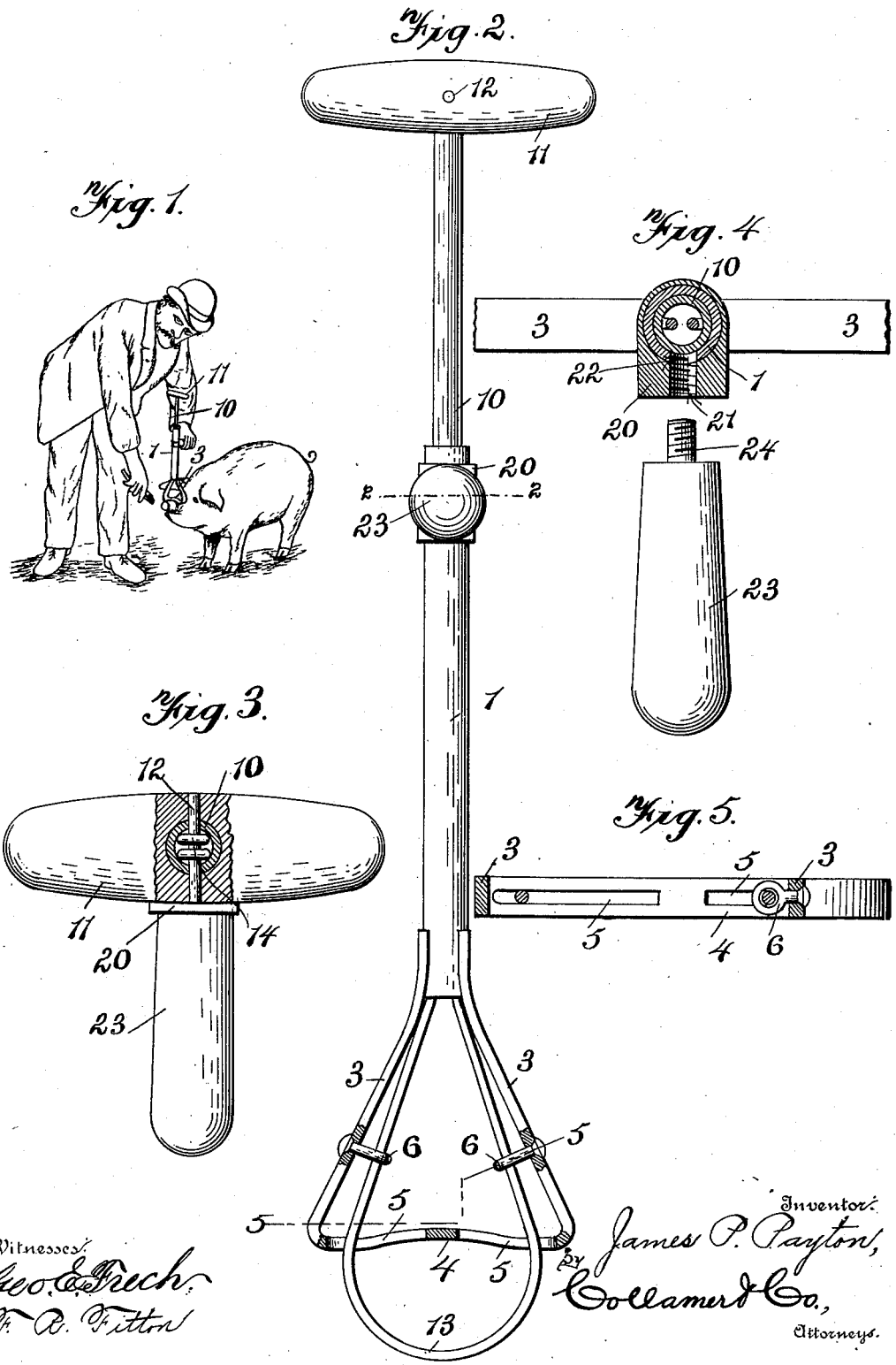

JAMES POLK PAYTON, OF LANCASTER, MISSOURI.

ANIMAL-HOLDER.

SPECIFICATION forming part of Letters Patent No. 662,960, dated December 4, 1900.

Application filed April 27, 1900. Serial No. 14,621. (No model.)

*To all whom it may concern:*

Be it known that I, JAMES POLK PAYTON, a citizen of the United States, and a resident of Lancaster, Schuyler county, State of Missouri, have invented certain new and useful Improvements in Animal-Holders; and my preferred manner of carrying out the invention is set forth in the following full, clear, and exact description, terminating with claims particularly specifying the novelty.

This invention relates to the care of live stock, and more especially to catching and holding tools; and the object of the same is to produce an improved animal-holder adapted more particularly for clamping the snout of a hog while being ringed.

To this end the invention consists in the details of construction hereinafter described and claimed and as shown in the drawings, wherein—

Figure 1 is a general view in outline showing the use of this tool. Fig. 2 is an enlarged rear elevation of the tool itself with the front portion of the cross-bar at the lower end of the triangular frame broken away and its side bars partly in section. Fig. 3 is a plan view of the upper handle, partly broken away on a line through the pin connecting the handle and stem. Fig. 4 is a section on line 2 2 of Fig. 2, taken through the boss and showing the lower handle or stop removed. Fig. 5 is a section on the line 5 5 of Fig. 2.

Referring to the drawings, the numeral 1 designates a tubular body, to whose lower end is attached a triangular frame composed of sides 3, diverging from the body and connected at their lower ends by a cross-bar 4, forming the stationary jaw of the clamp hereinafter described. This bar 4 is bowed upwardly a little between its extremities and is provided with two slots 5, nearly meeting at the center of the bar, as best seen in Fig. 5. Within said sides 3 at about the points shown are swiveled eyes 6, although these are not absolutely necessary.

10 is a stem preferably tubular and of a size to slide loosely through the body 1. Fixed to and across its upper extremity is the upper handle 11, which is preferably secured by a pin 12, passing transversely through the wooden body of the handle and through the tubular stem. A stout wire is bent at its center, as at 13, to form the movable jaw of the clamp above mentioned, whence it passes through the two slots 5, then through the two eyes 6, then upward into the lower end of the tubular body 1, then throughout the length of the stem 10, and finally has its extremities formed into eyes 24 embracing said pin, as seen in Fig. 3.

20 is a boss fixedly secured around the body near its upper end and having a threaded aperture 21, registering with a hole 22 through the side of the body.

23 is the lower handle or stop, having a threaded shank 24 of a size to take into said aperture and of a length adapted to be screwed through the same and into the hole in the body, so that its inner end makes frictional contact with the stem 10.

All parts are of desired sizes, shapes, proportions, and materials, although the handles are preferably of wood and the remainder of metal.

I do not limit myself to precise details of construction.

In operation, as best seen in Fig. 1, the stop is unscrewed slightly and the stem depressed, which opens the jaws of the clamp. The upper jaw 4 is passed over the snout and lower jaw 13 beneath it, the handle 11 is drawn upon until the jaws clamp the snout as tightly as may be necessary, and the stop is then quickly screwed inward to cause its shank to bear upon the stem and hold the latter against longitudinal movement within the body. Thereafter the tool is held in either hand, while the other hand is free to perform the operation of ringing.

I have shown and described the tool as used on a hog's snout; but it is obvious that it could be employed on other animals and for holding other parts of their bodies, such as their legs, though the wire at 13 should then be larger or flattened, so as not to lacerate the flesh.

What is claimed as new is—

1. An animal-holding tool comprising a tubular body with a hole in its side, a triangular open fixed jaw projecting below the lower end of the body, and a boss surrounding the body and having a threaded aperture registering the said hole; combined with a stem movable through the body and carrying a movable jaw at its lower end extending through the fixed jaw, and a handle having a threaded shank taking into the aperture and adapted to bear frictionally against the stem, as and for the purpose set forth.

2. An animal-holding tool comprising a tubular body, and a triangular frame whose sides are connected with the body and whose cross-bar forms a fixed jaw and is bowed slightly upward and provided with two slots nearly meeting at the center of this bar; combined with a stem movable through said body and having a handle at its upper end, and a wire forming a movable jaw and having its center below the fixed jaw and its ends passing through said slots and connected with the stem, as and for the purpose set forth.

3. An animal-holding tool comprising a tubular body, a triangular frame attached to its lower end and whose cross-bar forms a fixed jaw, and eyes swiveled within its side bars; combined with a stem movable within the body, and a movable jaw whose center coacts with the fixed jaw, and whose arms pass through said eyes and are connected with the stem, as and for the purpose set forth.

In testimony whereof I have hereunto subscribed my signature this the 24th day of April, A. D. 1900.

JAMES POLK PAYTON.

Witnesses:
LEM W. MELVIN,
W. C. GRAVES.